United States Patent
Sierra Lozano et al.

(10) Patent No.: US 12,546,825 B2
(45) Date of Patent: Feb. 10, 2026

(54) METHOD AND SYSTEM FOR PERFORMING TRANSFER FUNCTION MEASUREMENTS ON A DEVICE

(71) Applicant: Meyer Sound Laboratories, Incorporated, Berkeley, CA (US)

(72) Inventors: Juan David Sierra Lozano, Abu Dhabi (AE); Roger Schwenke, Alameda, CA (US); Swapan Gandhi, El Cerrito, CA (US)

(73) Assignee: Meyer Sound Laboratories, Incorporated, Berkeley, CA (US)

( * ) Notice: Subject to any disclaimer, the term of this patent is extended or adjusted under 35 U.S.C. 154(b) by 0 days.

(21) Appl. No.: 19/298,065

(22) Filed: Aug. 12, 2025

(65) Prior Publication Data

US 2025/0362345 A1 Nov. 27, 2025

Related U.S. Application Data

(63) Continuation of application No. PCT/US2024/052046, filed on Oct. 18, 2024.

(60) Provisional application No. 63/545,062, filed on Oct. 20, 2023.

(51) Int. Cl.
*G01R 31/319* (2006.01)
(52) U.S. Cl.
CPC ............... *G01R 31/31908* (2013.01)
(58) Field of Classification Search
None
See application file for complete search history.

(56) References Cited

U.S. PATENT DOCUMENTS 9,170,290 B1 * 10/2015 Clark ................ G01R 31/2626
10,440,498 B1 10/2019 Gari et al.

FOREIGN PATENT DOCUMENTS

| DE | 102005045627 A1 * | 1/2007 | ............. G11B 27/10 |
| JP | 2004274110 A | 9/2004 | |

OTHER PUBLICATIONS

International Search Report and Written Opinion in International (PCT) Application No. PCT/US2024/052046, dated Jan. 14, 2025.

(Continued)

*Primary Examiner* — Guerrier Merant
(74) *Attorney, Agent, or Firm* — Beeson Skinner Beverly, LLP

(57) ABSTRACT

A method for performing transfer function measurements on a device such as a loudspeaker (referred to as a device under test or DUT) using a two-channel transfer function analyzer without a live copy of the DUT test signal. A virtual reference test signal, which is a copy of the DUT test signal, begins playing into a channel of the transfer function analyzer at the estimated start time and estimated play-back speed of the DUT test signal. The known play-back speed of the virtual reference test signal is compared to the estimated play-back speed of the DUT test signal and any detected differences between these two signals compensated for by either adjusting the play-back speed of the virtual reference test signal or the play-back speed of the DUT output, or both. A system for performing this method includes a virtual reference module having a detection part and adjustment part.

23 Claims, 5 Drawing Sheets

(56) References Cited

OTHER PUBLICATIONS

Begin. "Transfer function measurements address test challenges for smart speakers, "Electronic Design and Test. on-line article. www.epdtonthenet.net. Oct. 1, 2019 (Oct. 1, 2019). Retrieved on Feb. 1, 2025. Retrieved from entire document.

Muller et al. "Transfer-Function Measurement with Sweeps." J Audio Eng Soc, vol. 49, No. 6. Jun. 6, 2001 (Jun. 6, 2001). Retrieved on Feb. 1, 2025. Retrieved from entire document.

* cited by examiner

METHOD AND SYSTEM FOR PERFORMING TRANSFER FUNCTION MEASUREMENTS ON A DEVICE

CROSS-REFERENCE TO RELATED APPLICATIONS

This application is a continuation of PCT application No. PCT/US24/52046 filed Oct. 18, 2024, which claims the benefit of U.S. Provisional Patent Application No. 63/545,062 filed Oct. 20, 2023, all of which are incorporated herein by reference.

BACKGROUND ART

The present invention relates to systems and methods for measuring the transfer function of devices, and more particularly for measuring the transfer function of a device without an accessible input. The invention has particular application in measuring the transfer function of loudspeakers, or other devices that have one or more loudspeakers as a component of the device.

Loudspeakers and devices having one or more loudspeakers, such as cell phones and wireless earphones, accept a signal that varies as a function of time as an input and produce a detectable acoustical output represented by a signal which varies as a function of time. The relative change the loudspeaker or other device (hereinafter collectively referred to as a device or devices) makes to the signal between the input and the output is known as the transfer function.

There are well known systems for measuring the transfer function of devices. Such measurement systems include two-channel analyzers which receive a copy of both the input and output from the device under test (sometimes referred to herein as a DUT). When a DUT is being measured, a third device, known as the playback device, may be required to provide the input signal. (Sometimes the two-channel-analyzer can serve as the playback device. Sometimes this can be a connecting analyzer.)

Usually two-channel-analyzers receive their copy of the input and output signals at the same time as the DUT, that is, they receive "live" copies of both signals. Alternatively, the live input and output signals can be recorded simultaneously and played back later ("offline") into the two-channel analyzer.

However, it is often inconvenient or impossible to get a live copy of the input signal to a device: the input connector may be proprietary, the input signal may be encrypted, or the input signal may be transmitted using a wireless point-to-point protocol. Moreover, two-channel analyzers that use a live copy of the input signal cannot continuously measure the playback speed of the playback device nor correct for its side effects. In general, open loop measurements are desirable in the context of "Smart Speakers."

The present invention facilitates measuring the transfer function in a situation where it is possible to get a live copy of the output of a DUT, but not a live copy of the input.

SUMMARY OF INVENTION

The invention is directed at a method and system of measuring the transfer function of a device capable of receiving an input and producing an output in response to the input, wherein the measurement is conducted by a transfer function analyzer having a first channel for receiving a test signal input and a second channel for receiving the output from a device under test (DUT), which is generated when the test signal is received by the DUT from a playback device.

The method includes first providing a test signal having desired characteristics over one or more frequency bands. The test signal will reside in a DUT playback device as a DUT test signal. The method further includes storing a copy of the DUT test signal separately from the DUT playback device as a virtual reference test signal (sometimes referred to herein as "virtual reference signal" or "reference signal"). This virtual reference signal is played into the first channel of the function analyzer separately from the DUT test signal residing in the playback device.

The method further includes causing the DUT playback device to play the DUT test signal into the DUT at a playback speed to produce a DUT output that is played into the second channel of the function analyzer. The DUT output is monitored to determine if the DUT test signal is being played into the DUT. When it is determined that the DUT test signal is being played into the DUT, a start time at which the DUT test signal begins playing is estimated along with the playback speed at which the DUT test signal is being played. The virtual reference test signal begins playing into the first channel of the transfer function analyzer at the estimated start time of the DUT test signal and at the estimated playback speed of the DUT test signal. This occurs while the monitored DUT output from the DUT is played into the second channel of the transfer function analyzer.

The method further provides for comparing the known playback speed of the virtual reference test signal to the estimated playback speed of the DUT test signal. If any differences between these two signals are detected, either the playback speed of the virtual reference test signal or the playback speed of the DUT output, or both, are adjusted to compensate for any detected differences between these two signals.

It shall be understood that the "estimated start time" for the DUT test signal can be at a time after the DUT test signal actually begins playing. The start time of the virtual reference test signal can be estimated to coincide with a segment of the DUT output generated after the DUT test signal begins playing. In a separate aspect of the invention, the virtual reference test signal can start playing at an offset corresponding to the difference between the DUT estimated start time and the amount of time it took to detect the DUT output estimated start time.

It shall also be understood that the above step of comparing the playback speed of the virtual reference test signal to the estimated playback speed of the DUT test signal and making needed adjustments to one or the other, or both, of these signals, can be performed before the virtual reference test signal begins playing. The virtual reference test signal would simply start playing at the estimated start time after the signal playback speed or speeds have been adjusted.

A virtual reference testing system in accordance with the invention is comprised of a virtual reference module configured to play the DUT output into the second channel of the transfer function analyzer. A copy of the test signal that is stored in the DUT playback device is stored in the virtual reference module as a virtual reference test signal. The virtual reference module is comprised of a detection part, an adjustment part, and a virtual reference player. The detection part is configured to:

i) detect the presence of an output from the DUT that is produced in response to a test signal being played into the DUT, ii) from the DUT output, estimate the time at which the DUT test signal began playing, and iii) from the DUT output, estimate the speed at which the DUT test signal is being played into the DUT.

The adjustment part of the virtual reference module is configured to:

i) compare the playing speed of the virtual reference test signal to the estimated playing speed of the DUT test signal, and ii) adjust as needed the playing speed of the virtual reference test signal or the playing speed of the DUT output that is played into the second channel of the transfer function analyzer, or both, to compensate for any differences between the estimated playing speed of the DUT test signal and the playing speed of the stored virtual reference test signal.

The virtual reference player is configured to play the stored virtual reference test signal into the first channel of a transfer function analyzer when the presence of a DUT output is detected at a speed adjusted by the adjustment part of the virtual reference module. The speed of the virtual reference test signal is thereby aligned with the speed of the DUT test signal.

Other aspects of the invention will be made apparent from the following description and claims.

DESCRIPTION OF EMBODIMENTS

Figure 1:
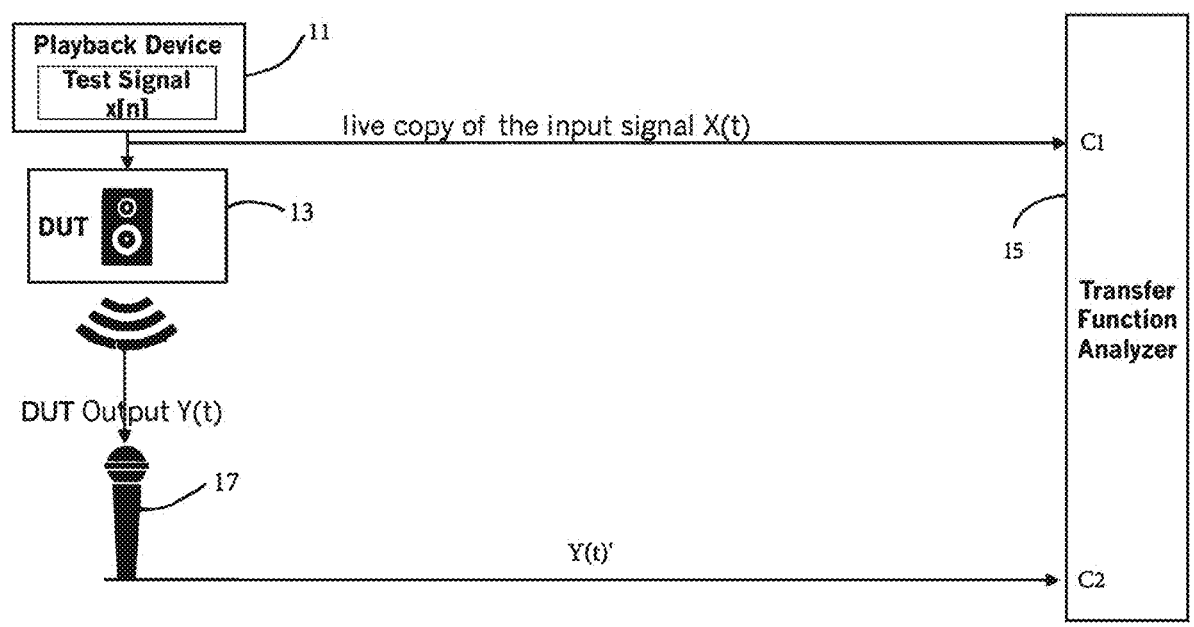
FIG. 1 is a pictorial illustration of a traditional system for measuring the transfer function of a loudspeaker or device having a loudspeaker component (DUT) using a two-channel transfer function analyzer.

Referring now to the drawings, FIG. 1 illustrates a commonly used approach to measuring the transfer function of a loudspeaker (DUT) using a two-channel transfer function analyzer. As shown in FIG. 1, a playback device 11 having a stored test signal, denoted x[n], plays the stored test signal, which as a function of time is denoted X(t), into the DUT 13, while at the same time playing a live copy of the test signal into the first channel (denoted C1) of the transfer function analyzer 15. It will be understood that, while playback device 11 is shown as being separate from the DUT, this device could be built into the DUT.

In response to the input test signal X(t) being played into the DUT, the DUT produces an acoustical output, denoted Y(t), which is picked up by microphone 17. Microphone 17 converts the acoustical output into electrical signal Y(t)' which can then be compared to X(t). Signal Y(t) is played into the second channel of the transfer function analyzer (denoted C2), so that it can be used by the analyzer to determine the transfer function of the DUT. (It is noted that because it is difficult to calculate the transfer function in the time domain the transfer function is usually implemented in the frequency domain. When there is no noise the transfer function is the ratio of the Fourier transforms of the signal: $Y(f)/X(f)$.)

Figure 2:
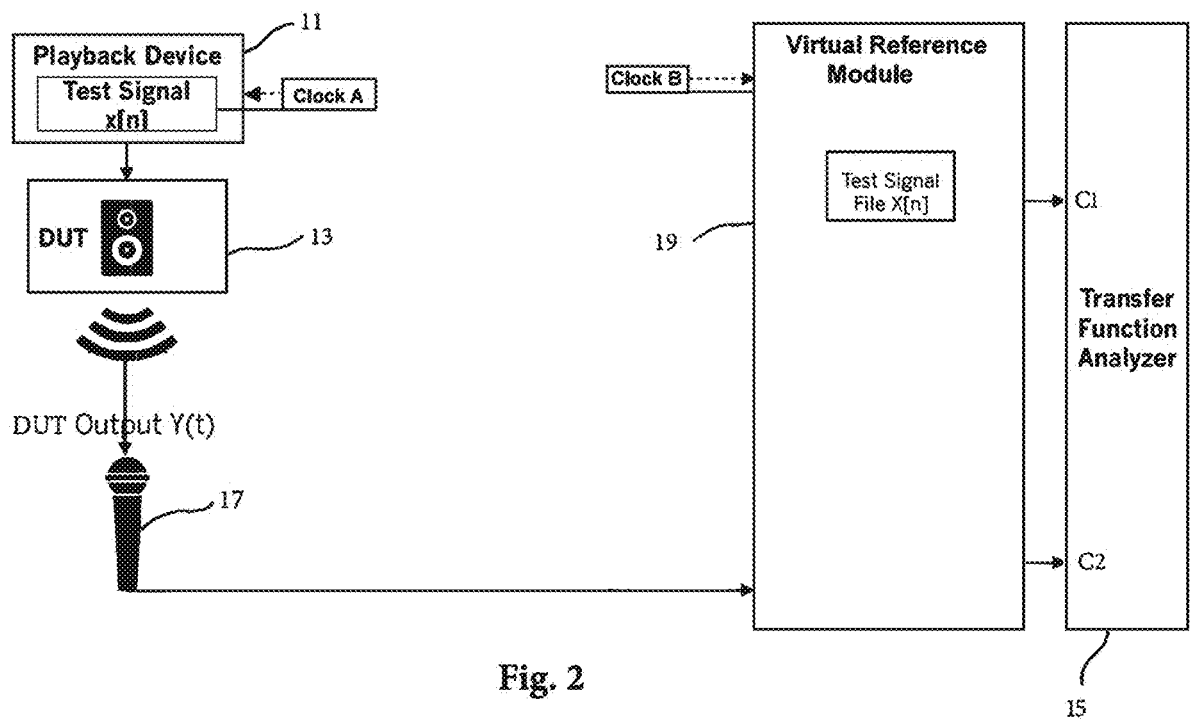
FIG. 2 is a pictorial illustration of a system for measuring the transfer function of a DUT using a separately stored copy of the device test signal as the input signal to the two-channel analyzer.

FIG. 2 illustrates the approach used to measure the transfer function of a loudspeaker with a two-channel transfer function analyzer where no live copy of the DUT test signal is readily accessible. Here, a copy of the DUT test signal x[n] stored in a DUT playback device 13 is stored separately from the playback device where it is accessible. This copy is referred to as a "virtual reference test signal," in that it is the same signal as the DUT test signal x[n] stored in playback device 11 used to play the test signal into the DUT. The place where the virtual reference test signal is stored is referred to as a "virtual reference module" denoted by the numeral 19 in FIG. 2. This module may be integrated into the transfer function analyzer or be a separate device.

It is seen that playback device 11 and virtual reference module 19 are driven by different clocks, designated clock A in the case of the playback device, which plays a test signal into the DUT, and clock B, which plays the virtual reference test signal into the C1 channel of the transfer function analyzer. As later described, the ability to adjust the virtual reference clock is a possible embodiment of the system and method of the invention.

By providing a separately stored virtual reference test signal which is accessible, the virtual test signal can be played into the C1 channel of the transfer function analyzer instead of a live copy of the DUT test signal in situations where a live copy of the test signal is not accessible. Attempts to do this have in the past involved detecting coherence between the virtual reference test signal played into analyzer channel C1 and the DUT output played into analyzer channel C2.

Figure 3:
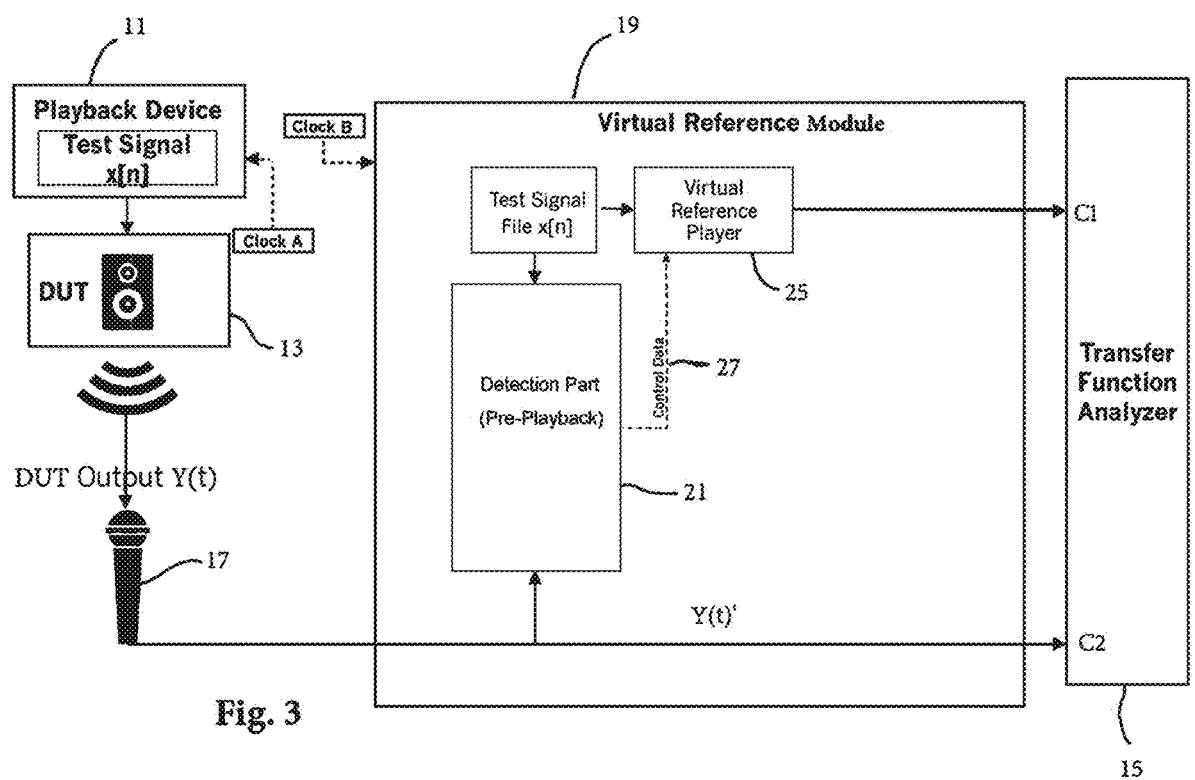
FIG. 3 is a pictorial illustration of a system for measuring the transfer function of a DUT using a separately stored copy of the device test signal as the input signal to the two-channel analyzer as shown in FIG. 2, with the addition of a detection part for detecting the presence of an output from the DUT that is produced in response to a test signal being played into the DUT.
Figure 4:
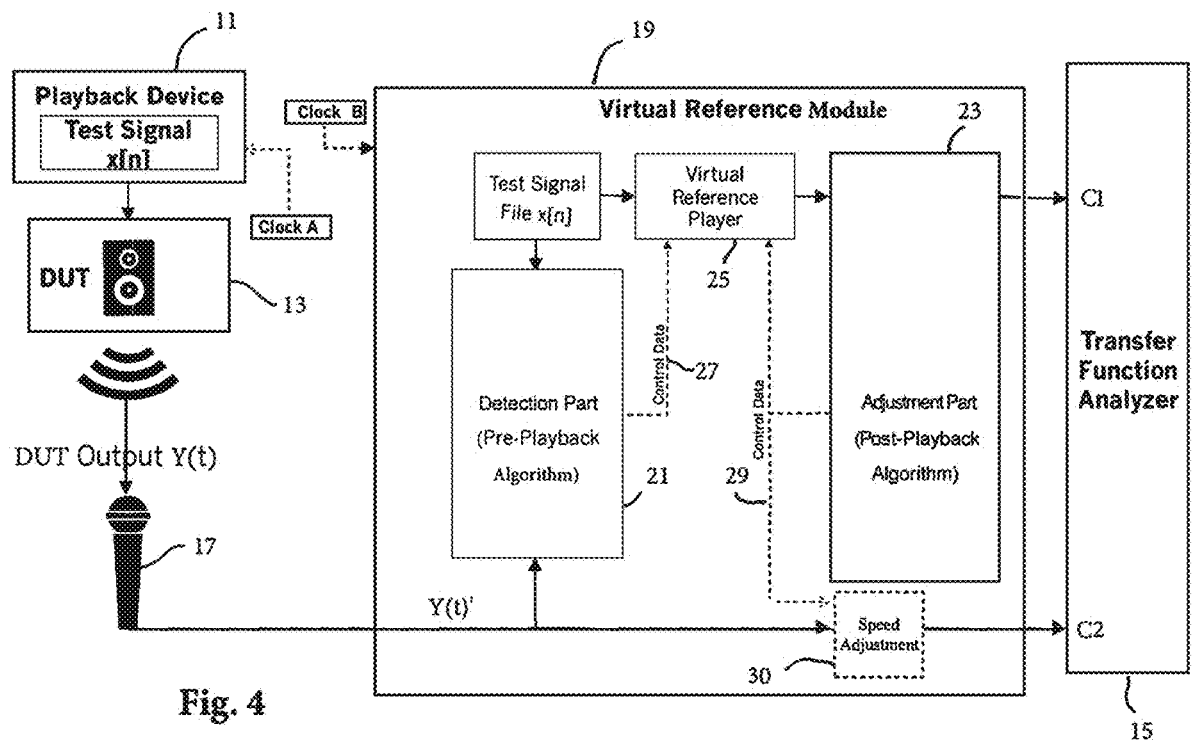
FIG. 4 is a pictorial illustration of a system for measuring the transfer function of a DUT using a separately stored copy of the device test signal as the input signal to the two-channel analyzer with a detection part as shown in FIG. 3, and with the addition of an adjustment part that compares the playing speed of the virtual reference test signal to the estimated playing speed of the DUT test signal and if needed adjusts either or both the playing speed of the virtual reference test signal or the playback speed of the DUT output to compensate for any differences between the estimated playback speed of the DUT test signal and the playback speed of the stored virtual reference test signal.

FIGS. 3 and 4 illustrate improvements to the basic approach of using a separately stored virtual reference test signal for the C1 channel input to the transfer function analyzer 15. FIG. 3 shows the addition of a detection part 21 configured to detect the presence of an output from the DUT that is produced in response to a test signal being played into the DUT. Once the presence of a DUT output is detected, the detection part estimates the time at which the DUT test signal began playing, as well as the speed at which the DUT test signal is being played into the DUT. FIG. 4 shows the further addition of an adjustment part 23, which is configured to compare the playing speed of the virtual reference test signal to the estimated playing speed of the DUT test signal and adjust as needed either or both the playing speed of the virtual reference test signal or the playing speed of the DUT output that is played into the channel C2 of transfer function analyzer 15. Within virtual reference module 19, it is seen that the start time estimated by the detection part and the playing speed adjustments made to the virtual reference test signal are implemented through a virtual reference player 25, which receives control data from both detection part 21 and adjustment part 23 as indicated by control data paths 27 and 29.

Further characteristics of the test signal and detection and adjustment parts of the virtual reference module 19 are described below.

Test Signal

The test signal needs to have energy at substantially all times and frequencies (such as a particular realization of pink noise) during the period needed by detection part 21 to lock onto the test signal. For the system illustrated in FIGS. 3 and 4 to work properly, the signal loaded into the playback device 11 must be the same as the signal loaded into the virtual reference module 19. Therefore, it is beneficial for the signal to be a uniquely identified time series such as signals identified by an international standard such as AES-75.

Signal Start Time Detection

The algorithm used by the detection part 21 of the virtual reference module are various combinations of the below described strategies. (These strategies could be implemented both for the detection part 21 and the adjustment part 23.)

If the statistics of the DUT output meet a criterion (such as an exponentially time-weighted RMS level exceeding a threshold), then the signal start has been detected. Playback of the virtual reference test signal (sometimes referred to herein as the "virtual reference" or "reference signal") could start at the beginning of a reference file x[n] when the magnitude statistics of the DUT output meet a certain criterion. The virtual reference playback would preferably start playing the reference file with a predetermined offset; however, use of an offset is not a requirement of the invention.

For a chosen segment of the reference signal, the cross-correlation is calculated between the reference signal segment and each successive segment of the DUT output. If magnitude statistics of cross-correlation meet a certain criterion, for example, if the peak of the cross-correlation exceeds the RMS of the cross-correlation by a chosen amount, then the signal start has been detected. A sharpening filter can be applied to the virtual reference and DUT output signals to increase the detectability of the cross-correlation peak of the reference and measured signals when they are aligned. This filter flattens the power spectrum of the reference signal and could be made adaptive, appropriately flattening the spectrum based on the spectrum of the reference signal selected.

If successive segments of the reference signal are cross-correlated with the DUT output, then statistics can be collected on the peak time of the cross-correlation. If the statistics of the cross-correlation peak time meet the chosen criterion, for example, if the peak time variance is below a threshold, then the signal start is detected.

Virtual reference playback could start at the beginning of the reference file when the cross-correlation peak time statistics meet a criterion. The virtual reference playback could start playing the reference file from a point in time calculated from the cross-correlation (such as the mean peak time).

Most suitably, the detection of the start of the DUT output is continually confirmed by continuing to calculate the cross-correlation between the DUT output and the playing virtual reference. If the statistics of this cross-correlation do not meet a criterion, then virtual playback of the reference signal may be stopped.

The peak time estimation may be refined using interpolation. This interpolation could be implemented in the time domain such as with quadratic interpolation, or it could be implemented in the frequency domain such as by estimating the slope of the phase. An improvement to frequency domain interpolation would be to incorporate the coherence, such as giving higher weight to frequencies with high coherence.

A possible additional feature would be to select several segments from the virtual reference file for concurrent comparison via cross-correlation with the DUT output. If for any of these cross-correlations the magnitude meets a criterion, then the signal start has been detected.

Playback Speed Detection

Playback speed can be estimated by comparing the DUT output with the output of virtual reference player 25. Playback speed may be estimated by measuring the slope of the location of the peak of the cross-correlation of two successive segments of the reference signal and the DUT output. The slope of a line fitted to the location of the peak across multiple successive segments can be used to estimate the playback speed.

Alternatively, playback speed could be estimated in the frequency domain by looking at the rate of change in phase of the transfer function. Coherence could be incorporated in the playback speed estimation, such as giving higher weight to frequencies with high coherence.

Still further, collected statistics from the detectors may be used to better estimate a fluctuating playback speed. For example, by modeling the playback speed as a slowly varying function, the associated means and standard deviations of those estimates allow the creation of a dynamic model of the DUT playback rate. This allows prediction of the probability distribution of future effective playback rates of the DUT. This information can be iteratively combined with a current estimate to more accurately estimate the true playback rate of the DUT which is hidden.

Playback speed would be estimated either in the detection part or adjustment part as shown in FIG. 4.

Logging Statistics of the Detectors

For each successive segment of the reference signal and the DUT output the following statistics could be captured:

Magnitude statistics of the cross-correlation for successive segments of the reference signal with the DUT output such as the peak and RMS.

Temporal statistics of the cross-correlation for successive segments of the reference signal with the DUT output such as the mean and deviation of the peak time.

The slope and higher order derivatives of the location of the peak of the cross-correlation for successive segments of the reference signal and the DUT output.

Coefficients of a regression model of the locations of the peak.

The mean and higher moments of the squared error terms of a regression model of the locations of the peak.

Quantities derived from the above such as "jitter" and "wander"

Playback Speed Compensation

Figure 5:
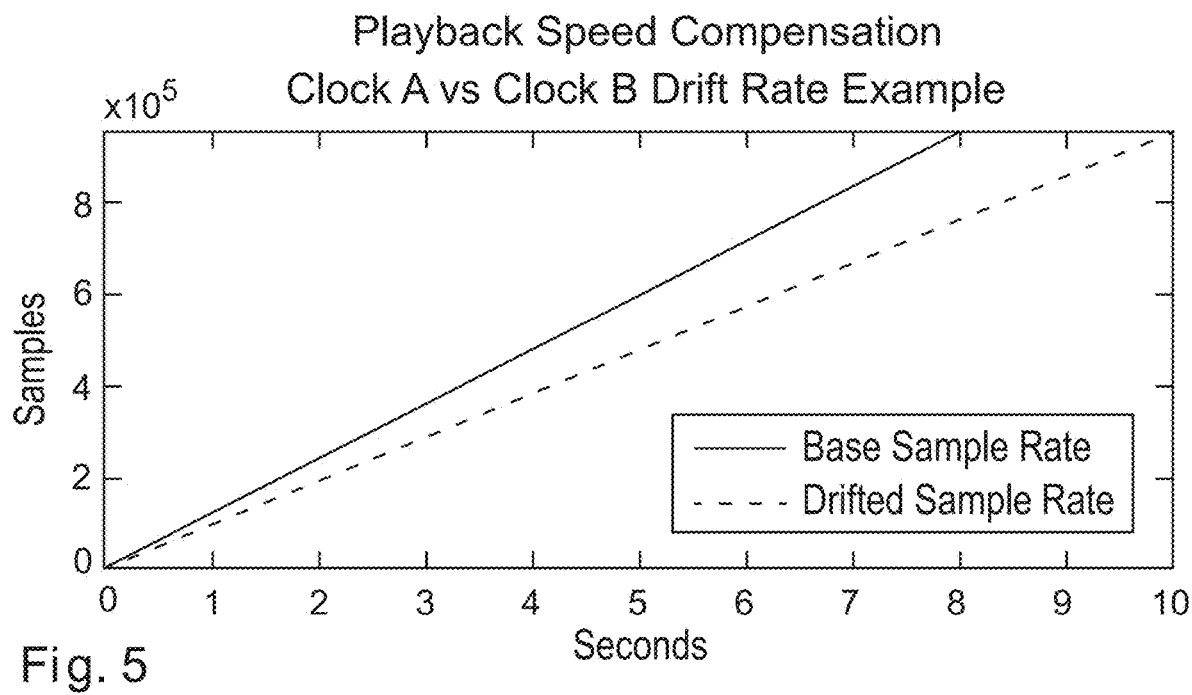
FIG. 5 is a graphical illustration of the playback speed compensation performed by the adjustment part of the virtual reference module shown in FIGS. 3 and 4.
Figure 6:
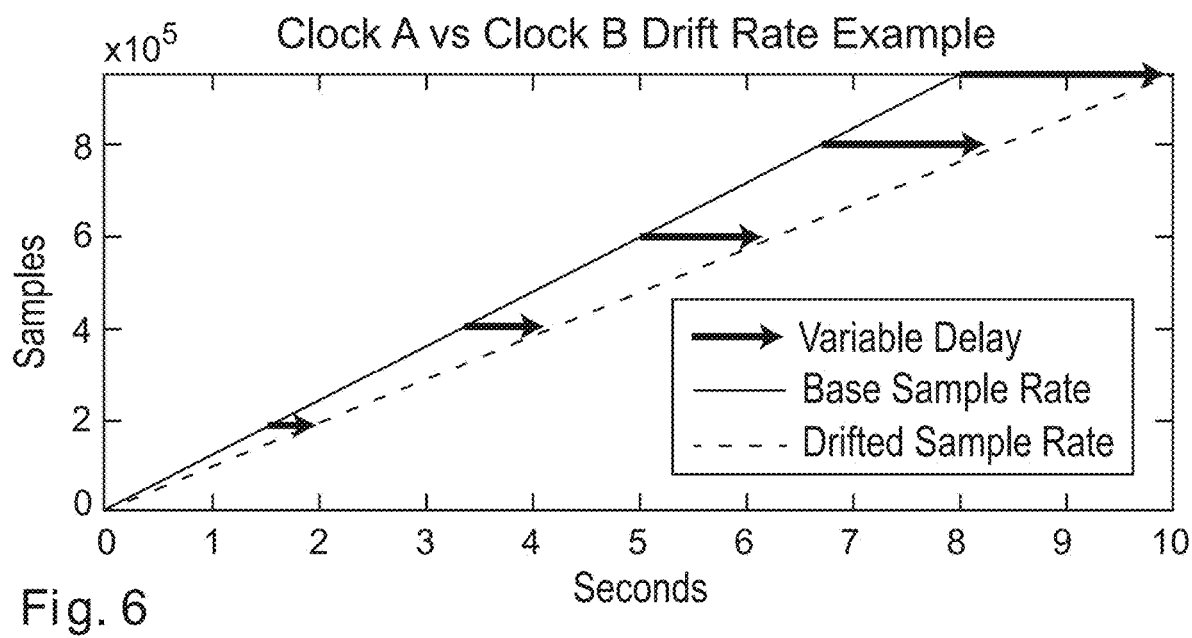
FIG. 6 is a graph showing an example of how the playback speed or the DUT test signal can drift over time, necessitating continuous adjustments over time.

Since the playback of the virtual reference test signal and the DUT test signal are driven by different clocks there is no guarantee that they will be played at the same speed. This could lead to difficulty in creating estimates of the transfer function as the two signals drift in alignment with respect to each other. When the DUT clock and the virtual reference module clock are constant but different, the peak time in the cross-correlation will change at a fixed rate as shown in FIG. 5.

Estimates of the effective playback rate of the DUT can be created via the slope of the logged location of the peak of the cross-correlation for successive segments of the reference signal and the DUT output. Alternatively, this could be the slope of a regression model fit to that same logged data.

Compensation for differences in DUT playback speed could be addressed by first pre-delaying one of the signals (virtual reference test signal playback or DUT output) in a buffer and then using interpolation to implement a fractional delay. The magnitude of this delay would be varied in proportion to estimated playback speeds previously determined. This imposes some memory requirements on the analyzer and limits the duration of the analysis, as the length of the pre-delay buffer determines the maximum variation in alignment of the two signals that can be compensated for as the signals drift. This compensation would occur in the adjustment part shown in block 23 in FIG. 4.

Alternatively, any difference in playback rates can be addressed by adjusting the playback speed of the virtual reference player 25 in proportion to the estimated playback speed of the reference file on the DUT. This would occur within the virtual reference player 25 shown in FIG. 4. With this approach there is no need to pre-allocate a buffer, no limitation on the duration of analysis and no maximum variation in alignment of the two signals that can be compensated for as the signals drift. Optionally, the reference file may be interpolated to a higher sample rate at the time that it is loaded into the virtual player to reduce computations needed during playback.

While the various embodiments of the invention have been described in considerable detail in the foregoing specification, it is not intended that the invention be limited to the described embodiments or the particular details of the described embodiments. It will be appreciated that variations on the described embodiments are possible without departing from the scope and spirit of the invention. For example, while the invention is described as being used in connection with a "two-channel analyzer," it will be understood that the invention can be used with a transfer function analyzer having a greater number of channels so long as there is an input channel for virtual reference test signal and an input channel for the DUT output.

We claim:

1. A method of measuring the transfer function of a device capable of receiving an input and producing an output in response to the input, wherein the measurement is conducted by a transfer function analyzer having a first channel for receiving a test signal input and a second channel for receiving the output from a device under test (DUT) which is generated when the test signal is received by the DUT from a playback device, the method comprising the steps of:
   A. providing a test signal having desired characteristics over one or more frequency bands, wherein the test signal resides in a DUT playback device as a DUT test signal,
   B. storing a copy of the DUT test signal separately from the DUT playback device as a virtual reference test signal,
   C. causing the DUT playback device to play the DUT test signal into the DUT at playback speed to produce a DUT output that is played into the second channel of the function analyzer,
   D. monitoring the DUT output to determine if the DUT test signal is being played into the DUT,
   E. doing the following when, based on the monitored DUT output, it is determined that the DUT test signal is being played into the DUT by the DUT playback device:
      i) estimating a start time at which the DUT test signal begins playing, and
      ii) estimating the playback speed at which the DUT test signal is played,
   F. begin playing the virtual reference test signal into the first channel of the transfer function analyzer at the estimated start time of the DUT test signal and at the estimated playback speed of the DUT test signal, and doing so while playing the monitored DUT output from the DUT into the second channel of the transfer function analyzer, and
   G. comparing the known playback speed of the virtual reference test signal to the estimated playback speed of the DUT test signal, and, if and as needed, adjusting the playback speed of the virtual reference test signal or the playback speed of the DUT output that is played into the second channel of the function analyzer, or both, to compensate for any differences between the estimated playback speed of the DUT test signal and the playback speed of the stored virtual reference test signal,
   steps F and G being performed in any order.

2. The method of claim 1 wherein the known playback speed of the virtual reference test signal is continuously compared with the estimated playback speed of the DUT test signal and wherein the known playback speed of the virtual reference test signal or the playback speed of the DUT output, or both, is continuously adjusted to compensate for any changes over time in either the estimated playback speed of the DUT test signal or in the playback speed of the stored virtual reference test signal, or both.

3. The method of claim 1 wherein estimating a start time at which the DUT test signal begins playing includes collecting and logging statistics for successive segments of the virtual reference test signal and DUT output and using the logged statistics to estimate a start time.

4. The method of claim 3 wherein the collected statistics for estimating a start time include at least one of the following: average, root-mean-square, or standard-deviation for differences between the DUT output and the stored virtual reference test signal.

5. The method of claim 1 wherein estimating the playback speed at which the DUT test signal is played includes collecting and logging statistics for successive segments of the virtual reference test signal and the DUT output and using the logged statistics to determine the playback speed of the DUT output.

6. The method of claim 5 wherein the collected statistics include at least one of the following:
   i) the slope of the location of the peak of the cross-correlation of two successive segments of the reference signal and the DUT output,
   ii) the slope of a line fitted across the peaks of multiple successive segments,
   iii) the rate of change in phase of the transfer function in the frequency domain.

7. The method of claim 5 wherein the known playback speed of the virtual reference test signal is continuously compared with the estimated playback speed of the DUT test signal and if the statistics of this cross-correlation do not meet a criterion, then virtual playback of the reference signal is stopped.

8. The method of claim 1 wherein a copy of the stored virtual reference test signal is played into the first channel of a transfer function analyzer with a predetermined offset with respect to the estimated start time of the DUT output.

9. The method of claim 1 wherein to estimate the time at which the test signal begins playing, a fixed segment of the stored virtual reference test signal is compared to segments of the DUT output to determine if a desired degree of correlation is achieved as determined by a correlation function.

10. The method of claim 9 wherein successive segments of the virtual reference test signal are compared to each successive segment of the DUT output until a desired correlation is achieved.

11. The method of claim 9 including monitoring the peak value and RMS value of the correlation function between the stored virtual reference test signal and DUT output to determine whether the peak value of the correlation function exceeds the RMS value by a chosen amount which indicates that the test signal has begun playing.

12. The method of claim 9 wherein a sharpening filter is applied to the virtual reference test signal segments and to DUT output segments to increase the detectability of peaks in the correlation function between the virtual reference test signal segment and successive segments of the monitored DUT output.

13. The method of claim 12 wherein the sharpening filter is selected based on the characteristics of the test signal.

14. The method of claim 9 wherein the timing of the peaks of the correlation function between the virtual reference test signal and DUT output segments is estimated by interpolation.

15. The method of claim 14 wherein interpolation is performed in the time domain.

16. The method of claim 15 wherein interpolation is performed in the frequency domain.

17. The method of claim 1 wherein playback speed is estimated by comparing the DUT output with the stored virtual reference test signal that is played into the first channel of a transfer function analyzer.

18. The method of claim 17 wherein the playback speed is estimated by measuring the slope of the location of the peak of the correlation function between successive segments of the reference signal and the DUT output.

19. The method of claim 18 wherein the playback speed is estimated by fitting a location line for the peaks in the correlation function across multiple successive segments and using its slope to estimate the playback speed.

20. A virtual reference testing system for measuring the transfer function of a device capable of receiving an input and producing an output in response to the input, wherein the measurement is conducted by a transfer function analyzer having a first channel for receiving a test signal input and a second channel for receiving an output from a device under test (DUT) which is generated when the test signal stored in a DUT playback device is played into the DUT, the virtual reference testing system comprising:

a virtual reference module configured to play the DUT output into the second channel of the function analyzer, a copy of the test signal that is stored in the DUT playback device being stored in the virtual reference module as a virtual reference test signal, the virtual reference module having a detection part, an adjustment part, and a virtual reference player, the detection part of the virtual reference module being configured to:
  i) detect the presence of an output from the DUT that is produced in response to a test signal being played into the DUT,
  ii) from the DUT output, estimate the time at which the DUT test signal began playing, and
  iii) from the DUT output, estimate the speed at which the DUT test signal is being played into the DUT, and the adjustment part of the virtual reference module being configured to:
  i) compare the playing speed of the virtual reference test signal to the estimated playing speed of the DUT test signal, and
  ii) adjust as needed the playing speed of the virtual reference test signal or the playing speed of the DUT output that is played into the second channel of the function analyzer, or both, to compensate for any differences between the estimated playing speed of the DUT test signal and the playing speed of the stored virtual reference test signal, and the virtual reference player being configured to play the stored virtual reference test signal into the first channel of a transfer function analyzer when the presence of a DUT output is detected and at a speed adjusted by the adjustment part of the virtual reference module.

21. The virtual reference testing system of claim 20 wherein the adjustment part of the virtual reference module continually compares the playing speed of the virtual reference test signal to the estimated playing speed of the DUT test signal, and continually adjusts as needed the playing speed of the virtual reference test signal or the playing speed of the DUT output, or both, to compensate for any changes in the playing speed of the DUT test signal or the playing speed of the stored virtual reference test signal.

22. The virtual reference testing system of claim 20 wherein, to estimate the time at which the test signal begins playing, the detection part compares one or more fixed segments of the stored virtual reference test signal to segments of the DUT output to determine if a desired degree of correlation is achieved.

23. The virtual reference testing system of claim 20 wherein, to estimate the time at which the test signal begins playing, the detection part collects and logs statistics for successive segments of the virtual reference test signal and DUT output, and cross-correlates the logged statistics.

* * * * *